US011655055B2

(12) United States Patent
Sharma

(10) Patent No.: US 11,655,055 B2
(45) Date of Patent: May 23, 2023

(54) SYSTEM AND METHOD FOR AERODYNAMIC DRAG REDUCTION IN AIRBORNE SYSTEMS AND VEHICLES

(71) Applicant: Vikrant Sharma, Ghaziabad (IN)

(72) Inventor: Vikrant Sharma, Ghaziabad (IN)

(73) Assignee: Vikrant Sharma

( * ) Notice: Subject to any disclaimer, the term of this patent is extended or adjusted under 35 U.S.C. 154(b) by 0 days.

(21) Appl. No.: 17/053,066

(22) PCT Filed: Feb. 19, 2019

(86) PCT No.: PCT/IN2019/050131
§ 371 (c)(1),
(2) Date: Nov. 4, 2020

(87) PCT Pub. No.: WO2019/211863
PCT Pub. Date: Nov. 7, 2019

(65) Prior Publication Data
US 2021/0070475 A1   Mar. 11, 2021

(30) Foreign Application Priority Data

May 4, 2018  (IN) .............................. 201811016997

(51) Int. Cl.
*B64G 1/00* (2006.01)
*B64G 1/14* (2006.01)
*B64C 23/00* (2006.01)
*B64G 1/40* (2006.01)
*B64G 1/64* (2006.01)

(52) U.S. Cl.
CPC ............... *B64G 1/002* (2013.01); *B64G 1/14* (2013.01); *B64C 23/005* (2013.01); *B64G 1/402* (2013.01); *B64G 1/641* (2013.01)

(58) Field of Classification Search
CPC .......... B64G 1/002; B64G 1/14; B64G 1/402; B64G 1/641; B64C 23/005; B64C 21/00
See application file for complete search history.

(56) References Cited

U.S. PATENT DOCUMENTS 5,088,277 A * 2/1992 Schulze .................. F02C 7/047
60/39.093

FOREIGN PATENT DOCUMENTS

CN  101277868 A * 10/2008 ........... B64C 23/005
DE  3804931 A * 8/1989

* cited by examiner

*Primary Examiner* — Valentina Xavier
(74) *Attorney, Agent, or Firm* — Barry Choobin; Patent 360LLC

(57) ABSTRACT

The embodiments herein disclose a retrofitted or in built or add-on kit/device for airborne vehicles to reduce the aerodynamic drag thereby increasing performance parameters/metrics of the vehicles. Drag reduction is achieved through shape/contour optimization, and/or heat/energy/fluid addition to the flow in neighbourhood of the vehicle. The device is designed with an external surface to offers the minimum drag. The device is configured to deposit heat/energy/fluid in neighbourhood of flying vehicle in several ways by generating/injecting hot gases in neighbourhood of vehicle for energy/heat addition, thereby causing maximum drag reduction. Heat/energy/fluid is added through the nozzles in the add-on kit/device.

10 Claims, 16 Drawing Sheets

SYSTEM AND METHOD FOR AERODYNAMIC DRAG REDUCTION IN AIRBORNE SYSTEMS AND VEHICLES

CROSS-REFERENCE TO RELATED APPLICATIONS

This present patent application claims the priority of the Indian Non-Provisional Patent Application filed on May 4, 2018 with the number 201811016997 and titled, "A SYSTEM AND METHOD FOR AERODYNAMICDRAG REDUCTION IN AIRBORNE SYSTEMS AND VEHICLES", and the contents of which are incorporated herein by the way of reference.

BACKGROUND

Technical Field

The embodiments herein are generally related to a field of airborne systems. The embodiments herein are particularly related to a device for enhancing a performance of the airborne systems. The embodiments herein are more particularly related to a device that reduces the aerodynamic drag experienced by the airborne systems.

Description of the Related Art

Aerospace systems continue to occupy an ever increasing role in today's world with applications in variety of domains like transportation, space, defense and many more. Continuous efforts are made to enhance the capabilities and performance of various aerospace systems. In order to enhance the performance of various aerospace systems, it is of prime importance to minimize the drag experienced by the system. Several methods are employed to reduce the drag associated with a flight vehicle. Some of these include reducing the base drag associated with the vehicle, an aerospike, various forms of turbulence reducing methods and many more. Also, many drag reduction techniques, that are developed so far, are not suitable for an actual implementation on a working system. Also, a point has been reached that drag reduction by existing techniques has been practically exhausted. Almost all the practical drag reduction techniques are suitable only for incorporation into a new system during a design phase, but they yield only a marginal improvement in performance. Therefore, new practical methods are needed for further drag reduction and performance enhancements to benefit existing as well as future aerospace systems.

In addition to the applications already enumerated above, Airborne systems such as artillery, ammunition, tank ammunition, mortars, rockets, missiles, aircrafts plays a crucial role during war. Consistent efforts are made to enhance the capabilities of these airborne systems such as range, penetration power, speed, lethality, time to target, fuel consumption etc. Some of the approaches adopted presently for performance enhancements of the airborne systems include Base-Bleed (BB), Extended Range Full Bore (ERFB) shell, Hyper Velocity Projectile (HVP), Rocket Assisted Projectile (RAP) and like.

In Base-Bleed approach, a gas generator is fitted at the end of the shell projectile. When the projectile travels in the air, a low-pressure region is developed at its wake region thereby giving rise to a pressure drag which is responsible for the reduction in the performance of the projectile. In BB, the gas generator constantly discharges gas in the wake region, thereby reducing or eliminating the base drag. However, this approach only marginally increases the range of the shell.

In case of Extended Range Full Bore (ERFB) shell, the shells are aerodynamically designed to have very low drag. This increases the performance of the shell. These are specially designed shells and are comparatively less in numbers. Also this technique is not used on the normal shells.

Similarly, Hyper Velocity Projectile (HVP) is also a specialized shell with a low drag shape and is enclosed in a sabot to fire fired from different guns. These are new type of shells and this technology is not suitable for use in the existing shells. Further, Rocket Assisted Projectile (RAP) Shells are equipped with rockets to increase the range. This reduces the payload capacity.

Thus, most of the above mentioned technologies are not suitable for integration with most of the shells already in service and those which are suitable for integration with the existing systems results only in marginal improvement in the performance. The Base bleed technique offers only a marginal improvement in range. EFRB and HVP are altogether totally different designs. RAP uses rocket for increasing the range thereby making the shell bulky and resulting in less payload carriage. Additionally, most of these approaches are utilized in comparatively less number of systems.

Thus, these systems improve the capabilities of the vehicle only marginally. Further these systems are not designed to cater all the types of aerospace systems including missiles, aircrafts, launch vehicles artillery shells, mortars, rockets, etc.

The aerodynamic drag depends upon the aerodynamics contour/shape of the flying vehicle to a large extent. In many cases, aerospace vehicle is not designed to maximise the aerodynamic efficiency and most of the times, the aerodynamic shape is not fully optimized. This is due to various constraints and compromises that are to be made only during the design. One of these constraints is the volume requirement for payload in the vehicle. This do not permit a slender shaped vehicle. Thus, a trade off among various conflicting design requirements results in not selecting the best aerodynamic design for the aerospace vehicles.

Hence, there is a need for a practical system to increase the capabilities and performance of the airborne systems as compared to currently available specialized systems. There is also a need for a device to improve the performance and capabilities of different types of aerospace systems. Further there is a need for a device/system to reduce the aerodynamic drag experienced by the aerospace systems for increasing the performance of the airborne systems. Yet there is a need to reduce the drag in the currently available systems to increase the capabilities of existing systems in addition to the upcoming/new aerospace systems. The invention is designed to reduce the drag and hence increase the capabilities in the existing systems in addition to upcoming systems.

The above-mentioned shortcomings, disadvantages and problems are addressed herein, and which will be understood by reading and studying the following specification.

OBJECTIVES OF THE EMBODIMENTS HEREIN

The primary object of the embodiments herein are to provide a device to increase the capabilities of various types of airborne systems by reducing the drag of the aerospace systems by a vast margin thereby increasing the capabilities like range extension, increased speed, reduced fuel consumption etc.

Another object of the embodiments herein are to provide a device that improves the performance of all the aerospace systems such as aircrafts, launch vehicles, rockets, missiles, artillery shells, mortars etc.

Yet another object of the embodiments herein is to provide a device to reduce the aerodynamic drag experienced by the airborne systems.

Yet another object of the embodiments herein is to provide an add-on kit/system which is retrofitted/in-built into the existing aerospace systems for drag reduction.

Yet another object of the embodiments herein are to provide a device to achieve aerodynamic drag reduction in airborne systems through shape/contour optimization and/or heat/energy addition and/or fluid injection to the flow in the neighbourhood of the flying vehicle.

Yet another object of the embodiments herein are to provide a device capable of injecting fuel/hot gases/fluid into the upcoming air-flow ahead of the flying vehicle at required Mach number, pressure etc., thereby depositing the heat/energy in the form of a jet reducing the drag.

Yet another object of the embodiments herein are to provide a device that is capable of dissipating heat/energy at an optimal distance from the body of the vehicle thereby resulting in a maximum drag reduction.

Yet another object of the embodiments herein are to provide a device provided with fuels with low auto ignition temperatures that are injected into an incoming flow ahead of the flight vehicle for auto ignition thereby producing hot gases that are spread over the surface of the flight vehicle to reduce the density and pressure and hence decreasing the drag.

Yet another object of the embodiments herein are to provide a device with different chambers containing the fuels/substances that are allowed to mix during a flight in the flying vehicle to generate high temperature gases.

Yet another object of the embodiments herein are to provide a device capable of injecting fuels/substances that ignites upon coming into contact with air to produce heat.

Yet another object of the embodiments herein are to provide a drag reduction system capable of being inbuilt/retrofit into the existing aerospace systems.

These and other objects and advantages of the embodiments herein will become readily apparent from the following detailed description taken in conjunction with the accompanying drawings.

SUMMARY

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The following details present a simplified summary of the embodiments herein to provide a basic understanding of the several aspects of the embodiments herein. This summary is not an extensive overview of the embodiments herein. It is not intended to identify key/critical elements of the embodiments herein or to delineate the scope of the embodiments herein. Its sole purpose is to present the concepts of the embodiments herein a simplified form as a prelude to the more detailed description that is presented later.

The embodiments herein provide a device for reducing aerodynamic drag experienced by aerospace systems. The embodiments herein discloses a retrofitted add-on kit/device for retrofitting or being inbuilt in the existing airborne vehicles to reduce the aerodynamic drag on the airborne vehicles thereby increasing the performance metrics or parameters or characteristic of the airborne vehicles significantly. Drag reduction is achieved through techniques including shape/contour optimization, and heat/energy/fluid addition to the flow in the neighbourhood of the flight vehicle. The add-on kit/device is designed with an external contour to offer a minimum drag. The retrofitted add-on kit/device is capable of injecting/generating hot gases in the neighbourhood of the flight vehicle for energy/heat/fluid addition thereby resulting in considerable drag reduction. The hot gases for heat/energy addition is injected through various outlets in the retrofitted add-on kit/device. The device is configured to inject fuel or hot gas to deposit heat/energy in many ways.

According to one embodiment herein, the device comprises a hollow structure/container configured for retrofitting on a flying/airborne vehicle. The hollow structure comprises an internal contour and an external contour. The internal contour of the hollow structure is configured for physically attaching with the flying/airborne vehicle. The hollow structure is configured to be attached with the flying/airborne vehicle to alter the external profile of the vehicle to change a shape of the vehicle to provide a minimum aerodynamic drag. The device is designed/configured to be hollow to house/accommodate the heat/energy/fluid injection mechanism inside. The hollow structure/container is filled with one or more fuels/propellants/oxidizers/compounds/substances that are selected from a group consisting of a gas, a vapour, a liquid, particulate aerosol, solid, and a mixture thereof. The hollow structure further comprises one or more nozzles that are provided in the external contour of the structure. The one or more nozzles are configured for injecting the one or more gases/fuels/compounds/substances into an upcoming air-flow in the neighbourhood of the flying/airborne vehicle. The one or more fuel/hot gases/fluids are injected to deposit energy/heat/fluid in the neighbourhood of the flying/airborne vehicle to achieve further aerodynamic drag reduction to increase an efficiency of characteristic parameters of the flying/airborne vehicle. Thus the device is configured to reduce the drag by two methods/ways. The two methods/ways include changing the shape of the device upon installation into the aerospace vehicle to increase aerodynamics of the vehicle and depositing a heat/energy/fluid in the neighbourhood of the vehicle to reduce a drag further.

The hot gases are injected in a plurality of ways through one or more nozzles. The hot gases are configured for spreading over the surface of the vehicle thereby reducing the density and pressure which results in reducing the aerodynamic drag experienced by the flying vehicle. The fluid/energy/heat is injected to increase a shock standoff distance and to replace the strong shocks with weak oblique shocks.

According to an embodiment herein, the shape of the hollow structure is selected from a plurality of shapes based on one or more flying conditions of the flying vehicle. The plurality of predetermined shapes comprises Haack-series based nose cone, power series based nose cone, Von Karman nose cone, parabolic nose cone, conical, bi-conical, tangent ogive, spherically blunted tangent ogive, secant ogive and elliptical shape etc. The plurality of predetermined shapes are specially designed for reducing drag to a minimum drag.

According to an embodiment herein, the device further comprises a tubular section formed/arranged ahead of the hollow structure. The tubular section is configured for injecting hot gases/heat deposition/fluid deposition at an optimum distance from the vehicle to achieve maximum drag reduction using a pre-specified length of the tubular section.

According to an embodiment herein, the hollow structure/container is filled with one or more fuels having low auto ignition temperatures when the one or more fuels/substances come into contact with air. The auto-ignition of the fuels takes place due to the high temperatures formed ahead of the vehicle and the shock waves generated from a movement of the vehicles. The fuel is selected from a group consisting of Acetylene, Ethylene, Methane, Propane etc. Auto-ignition is also configured to take place without shock when the temperature is high enough. Assisted ignition is also taken place/formed.

According to an embodiment herein, the device further comprises one or more gas generators placed within the hollow structure. The gas generators are configured for producing high temperature/hot gases upon ignition, and wherein the generated hot gases are ejected out of the hollow structure through one or more nozzles.

According to an embodiment herein, the hollow structure/container is filled with one or more fuels/substances which auto ignites spontaneously when they come in contact with air (e.g. Carbon disulphide).

According to an embodiment herein, the device further comprises one or more chambers formed within the hollow structure/container and filled with one or more fuels/substances. The fuels/substances present in the one or more chambers are configured for mixing and reacting when the flying vehicle is airborne. The one or more chambers are filled with a plurality of mutually different propellants and oxidizers that are configured to combust and produce heat/energy.

According to an embodiment herein, the hollow structure/container is filled with one or more fuels that are configured for ignition inside the device to produce high temperature hot gases. According to one embodiment herein, the one or more fuels are hypergolic propellants.

According to an embodiment herein, the mass flow, Mach number of injection and pressure of the one or more gases/fuels/compounds/substances/fluids injected into the upcoming air-flow in the neighbourhood of the flying vehicle are dependent on the Mach speed of the flying vehicle. The mass flow, Mach number of injection and pressure of the one or more gases/fuels/compounds/substances/fluids are selected to achieve a maximum drag reduction.

According to an embodiment herein, the device is configured for heat deposition/generation, energy deposition/generation, fluid injection by routing the heat/fluids/energy through other sections of the vehicle. According to one embodiment herein, a portion of the exhaust for the heat/energy/fluid injection or a part of the fuel is routed to the device for depositing heat/energy deposition for reducing the drag.

According to an embodiment herein, the flying vehicle/airborne vehicle includes any aerospace vehicles.

According to an embodiment herein, the flying vehicle/airborne vehicle includes aircrafts, launch vehicles, missiles, projectiles, rockets, artillery ammunition, mortars, tank ammunition, etc.

According to an embodiment herein, the enhancement of characteristic parameters of the flying/airborne vehicle includes drag reduction, Range extension, increased penetration, increased speed, increased kinetic energy, decreased time to target, enhanced lethality, decreased fuel consumption, etc.

The embodiments herein provide a device to reduce the aerodynamic drag experienced by the aerospace systems. The embodiments herein disclose a retrofitted add-on kit/device designed to be installed on an existing and planned airborne vehicles to reduce the aerodynamic drag on the airborne vehicles thereby increasing the performance parameters of the vehicles significantly. The device is also configured to be inbuilt/retrofit in the existing system. The device is configured to achieve a reduction in drag by optimizing the shape/contour, and/or by adding heat/energy/fluid to the flow in the neighbourhood of the flying vehicle. The device is designed with an external contour which offers minimum drag.

According to an embodiment herein, the retrofitted add-on kit/device is designed/configured to inject/generate hot gases in the neighbourhood of the flying vehicle for adding energy/heat, thereby achieving a maximum drag reduction. The hot gases are injected for heat/energy addition through the plurality of outlets/nozzles provided in the retrofitted add-on kit/device. The device is configured for a heat/energy deposition in a plurality of ways. The plurality of ways comprises at least a fuel or hot gas injection process, a heat deposition though any other method and a fluid injection.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of an illustration and not of a limitation. Many changes and modifications may be made within the scope of the embodiments herein without departing from the spirit thereof, and the embodiments herein include all such modifications.

BRIEF DESCRIPTION OF THE DRAWINGS

The other objects, features, and advantages will occur to those skilled in the art from the following description of the preferred embodiment and the accompanying drawings in which.

Figure 1:
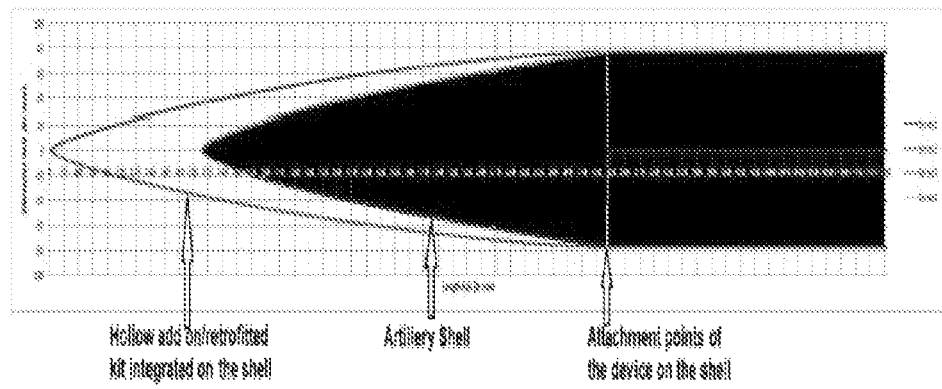
FIG. 1 illustrates a side view of a device with a low drag contour (Von Karman nose) integrated on an artillery shell for reducing drag, according to an embodiment herein.

FIG. 8 illustrates a side view of a retrofitted kit/device for reducing the aerodynamic drag experienced by the artillery shell, according to an embodiment herein.

FIG. 9 illustrates a side view of the retrofitted kit installed with the shell for reducing the aerodynamic drag experienced by the artillery shell, according to an embodiment herein.

FIG. 10 illustrates a side view of the retrofitted kit with the pipe for heat deposition/fluid injection at an optimum distance from the aerospace system for reducing the aerodynamic drag, according to an embodiment herein.

FIG. 11 illustrates a side view of the retrofitted kit with the tanks, according to an embodiment herein.

FIG. 12 illustrates a side view of the retrofitted kit with the aero-spike for reducing the aerodynamic drag, according to an embodiment herein.

FIG. 13 illustrates a side view of the retrofitted kit as an inbuilt structure for reducing the aerodynamic drag, according to an embodiment herein.

FIG. 14A illustrates a side view of a launch vehicle and a payload section of the launch vehicle installed with the retrofitted kit respectively for reducing the aerodynamic drag, indicating the kit installed externally on the launch vehicle according to an embodiment herein.

FIG. 14B illustrates a side view of a launch vehicle and a payload section of the launch vehicle installed with the retrofitted kit respectively for reducing the aerodynamic drag, indicating the kit installed internally in the payload section of the launch vehicle according to an embodiment herein.

FIG. 15 A and FIG. 15B illustrates the simulation results for flow field of PSLV without and with installation of the retrofitted kit respectively for reducing the aerodynamic drag, according to one embodiment herein.

FIG. 16 illustrates the nose section of a long-range ballistic missile installed with the retrofitted kit for reducing the aerodynamic drag, according to an embodiment herein.

FIG. 17A and FIG. 17B illustrate the simulation results carried out for an artillery ammunition with the add-on kit installed without and with energy/heat deposition in the neighbourhood of the shell respectively, according to one embodiment herein.

FIG. 18 illustrates the normalized trajectories of M795 artillery ammunition and M795 artillery ammunition installed with the add-on kit, according to one embodiment herein.

FIG. 19 illustrates a schematic diagram depicting wings attached to the add-on kit, according to one embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The embodiments herein provide a device for reducing aerodynamic drag experienced by aerospace systems. The embodiments herein discloses a retrofitted add-on kit/device for retrofitting or being inbuilt in the existing airborne vehicles to reduce the aerodynamic drag on the airborne vehicles thereby increasing the performance metrics or parameters or characteristic of the airborne vehicles significantly. Drag reduction is achieved through techniques including shape/contour optimization, and heat/energy/fluid addition to the flow in the neighbourhood of the flight vehicle. The add-on kit/device is designed with an external contour to offer a minimum drag. The retrofitted add-on kit/device is capable of injecting/generating hot gases in the neighbourhood of the flight vehicle for energy/heat/fluid addition thereby resulting in considerable drag reduction. The hot gases for heat/energy addition is injected through various outlets in the retrofitted add-on kit/device. The device is configured to inject fuel or hot gas to deposit heat/energy in many ways.

According to an embodiment herein, the device comprises a hollow structure/container configured for retrofitting on a flying/airborne vehicle. The hollow structure comprises an internal contour and an external contour. The internal contour of the hollow structure is configured for physically attaching with the flying/airborne vehicle. The hollow structure is configured to be attached with the flying/airborne vehicle to alter the external profile of the vehicle to change a shape of the vehicle to provide a minimum aerodynamic drag. The device is designed/configured to be hollow to house/accommodate the heat/energy/fluid injection mechanism inside. The hollow structure/container is filled with one or more fuels/propellants/oxidizers/compounds/substances that are selected from a group consisting of a gas, a vapour, a liquid, particulate aerosol, solid, and a mixture thereof. The hollow structure further comprises one or more nozzles that are provided in the external contour of the structure. The one or more nozzles are configured for injecting the one or more gases/fuels/compounds/substances into an upcoming airflow in the neighbourhood of the flying/airborne vehicle. The one or more fuel/hot gases/fluids are injected to deposit energy/heat/fluid in the neighbourhood of the flying/airborne vehicle to achieve further aerodynamic drag reduction to increase an efficiency of characteristic parameters of the flying/airborne vehicle. Thus, the device is configured to reduce the drag by two methods/ways. The two methods/ways include changing the shape of the device upon installation into the aerospace vehicle to increase aerodynamics of the vehicle and depositing a heat/energy/fluid in the neighbourhood of the vehicle to reduce a drag further.

The hot gases are injected in a plurality of ways through one or more nozzles. The hot gases are configured for spreading over the surface of the vehicle thereby reducing the density and pressure which results in reducing the aerodynamic drag experienced by the flying vehicle. Similarly the heat/energy deposition results in the decrease of the density around the flying vehicle thereby making the medium surrounding the vehicle as a rarely dense medium and resulting in drag reduction as the drag experienced by the vehicle is directly proportional to the density of the medium in which the vehicle is travelling. The fluid/energy/heat is injected to increase a shock standoff distance and to replace the strong shocks with weak oblique shocks.

According to an embodiment herein, the shape of the hollow structure is selected from a plurality of shapes based on one or more flying conditions of the flying vehicle. The plurality of predetermined shapes comprises Haack-series based nose cone, power series based nose cone, Von Karman nose cone, parabolic nose cone, conical, bi-conical, tangent ogive, spherically blunted tangent ogive, secant ogive and elliptical shape etc. The plurality of predetermined shapes are specially designed for reducing drag to a minimum drag.

According to an embodiment herein, the device further comprises a tubular section formed/arranged ahead of the hollow structure. The tubular section is configured for injecting hot gases/heat deposition/fluid deposition at an optimum distance from the vehicle to achieve maximum drag reduction using a pre-specified length of the tubular section.

According to an embodiment herein, the hollow structure/container is filled with one or more fuels having low auto ignition temperatures when the one or more fuels/substances come into contact with air. The auto-ignition of the fuels takes place due to the high temperatures formed ahead of the vehicle and the shock waves generated from a movement of the vehicles. The fuel is selected from a group consisting of Acetylene, Ethylene, Methane, Propane etc. Auto-ignition is also configured to take place without shock when the temperature is high enough. Assisted ignition is also taken place/formed.

According to an embodiment herein, the device further comprises one or more gas generators placed within the hollow structure. The gas generators are configured for producing high temperature/hot gases upon ignition, and wherein the generated hot gases are ejected out of the hollow structure through one or more nozzles.

According to an embodiment herein, the hollow structure/container is filled with one or more fuels/substances which auto ignites spontaneously when they come in contact with air (e.g. Carbon disulphide).

According to an embodiment herein, the device further comprises one or more chambers formed within the hollow structure/container and filled with one or more fuels/substances. The fuels/substances present in the one or more chambers are configured for mixing and reacting when the flying vehicle is airborne. The one or more chambers are filled with a plurality of mutually different propellants and oxidizers that are configured to combust and produce heat/energy.

According to an embodiment herein, the hollow structure/container is filled with one or more fuels that are configured for ignition inside the device to produce high temperature hot gases. According to an embodiment herein, the one or more fuels are hypergolic propellants.

According to an embodiment herein, the mass flow, Mach number of injection and pressure of the one or more gases/fuels/compounds/substances/fluids injected into the upcoming air-flow in the neighbourhood of the flying vehicle are dependent on the Mach speed of the flying vehicle. The mass flow, Mach number of injection and pressure of the one or more gases/fuels/compounds/substances/fluids are selected to achieve a maximum drag reduction.

According to an embodiment herein, the device is configured for heat deposition/generation, energy deposition/generation, fluid injection by routing the heat/fluids/energy through other sections of the vehicle. According to an embodiment herein, a portion of the exhaust for the heat/energy/fluid injection or a part of the fuel is routed to the device for depositing heat/energy deposition for reducing the drag.

According to an embodiment herein, the flying vehicle/airborne vehicle includes any aerospace vehicles.

According to an embodiment herein, the flying vehicle/airborne vehicle includes aircrafts, launch vehicles, missiles, projectiles, rockets, artillery ammunition, mortars, tank ammunition, etc.

According to an embodiment herein, the enhancement of characteristic parameters of the flying/airborne vehicle includes drag reduction, Range extension, increased penetration, increased speed, increased kinetic energy, decreased time to target, enhanced lethality, decreased fuel consumption, etc.

The embodiments herein provide a device to reduce the aerodynamic drag experienced by the aerospace systems. The embodiments herein disclose a retrofitted add-on kit/device designed to be installed on an existing and planned airborne vehicles to reduce the aerodynamic drag on the airborne vehicles thereby increasing the performance parameters of the vehicles significantly. The device is also configured to be inbuilt/retrofit in the existing system. The device is configured to achieve a reduction in drag by optimizing the shape/contour, and/or by adding heat/energy/fluid to the flow in the neighbourhood of the flying vehicle. The device is designed with an external contour which offers minimum drag.

According to an embodiment herein, the retrofitted add-on kit/device is designed/configured to inject/generate hot gases in the neighbourhood of the flying vehicle for adding energy/heat, thereby achieving a maximum drag reduction. The hot gases are injected for heat/energy addition through the plurality of outlets/nozzles provided in the retrofitted add-on kit/device. The device is configured for a heat/energy deposition in a plurality of ways. The plurality of ways comprises at least a fuel or hot gas injection process, a heat deposition though any other method and a fluid injection.

According to an embodiment herein, the retrofitted add-on kit/device is capable of injecting/generating hot gases in the neighbourhood of the flying vehicle for energy/heat addition, thereby causing maximum drag reduction. The injection of hot gases for heat/energy addition is performed through various outlets in the retrofitted add-on kit/device. The device is capable of heat/energy deposition in number of ways.

According to an embodiment herein, the device is configured for heat deposition/generation, energy deposition/generation, fluid injection by routing the heat/fluids/energy through other sections of the vehicle. According to an embodiment herein, a portion of the exhaust for the heat/energy/fluid injection or a part of the fuel to the device are rerouted for the purpose of heat/energy deposition for the purpose of drag reduction.

According to an embodiment herein, the aerodynamic drag depends upon the aerodynamics contour/shape of the flying vehicle. A family of shapes for the nose of the flying vehicle that offers the least aerodynamic drag for a particular flying conditions are available and designed. Some of these shapes are Haack-series based nose cone, power series-based nose cone, Von Karman nose cone, parabolic nose cone, conical, bi-conical, tangent ogive, spherically blunted tangent ogive, secant ogive, elliptical etc. Also a higher fineness ratio (Length/diameter) of the order of about 5 and more offers the lowest drag is required for drag reduction. With further increase in the fineness ratio, the drag reduction is relatively less. Therefore, the external shape/contour of the device of embodiments herein are designed based on the above described shapes which are chosen based on the flying conditions of the airborne vehicle.

According to an embodiment herein, the best shape is Von Karman nose for an artillery shell which travels at a Mach number of about 2.5. Hence the device is shaped as a Von Karman contour with a fineness ratio of 5 for the artillery shell. The fineness ratio is variable and is altered based on the requirements and other design constraints. This device is configured to be retrofitted to the flying vehicle. This device is configured to modify the shape of the existing flying vehicle to a shape that offers the least aerodynamic drag and thereby enhancing its performance. The device is also designed as a hollow structure. Thus, the embodiments of the device are an add-on structure/kit which makes the existing vehicle more aerodynamic.

According to an embodiment herein, the add-on kit is designed for a plurality of flying vehicles and for a plurality of flight conditions. According to an embodiment herein, the add-on kit is shaped as a Von-Karman nose with a fineness ratio of 5, and is integrated on the flying vehicle as shown in FIG. 1. The integration of the device alters the external profile of the flying vehicle to a shape which offers the minimum aerodynamic drag. This improves the efficiency of the flying vehicle.

Figure 2:
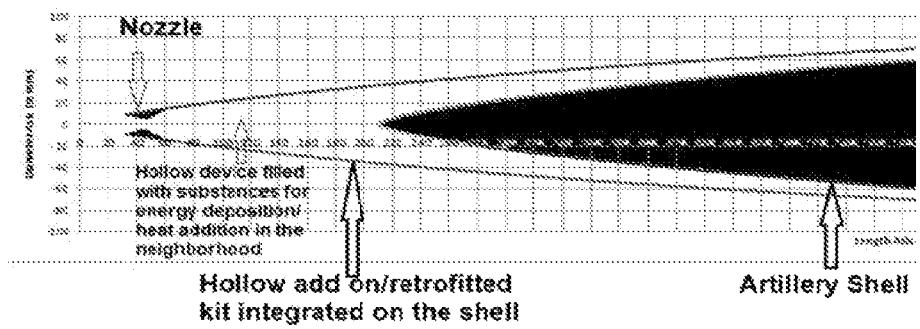
FIG. 2 illustrates a side view of a device with a nozzle at afore end for energy deposition/heat addition/fluid injection in the neighbourhood of the flying vehicle for reducing drag, according to an embodiment herein.

FIG. 2 illustrates a device having a nozzle at the fore end for energy deposition/heat addition/fluid injection in the neighbourhood of the flying vehicle, according to an embodiment herein are the reduction of aerodynamic drag is achieved through energy/heat deposition or fluid injection in the neighbourhood of the nose of the flying vehicle. When the energy is released in the neighbourhood of the flying vehicle, the drag is reduced as the density of the air is reduced and a reduced pressure zone is developed due to heat release. According to an embodiment herein, energy is deposited (heat is released) in the flow ahead of the vehicle. The heat energy is deposited in the neighbourhood of the vehicle at a region where the drag reduction is maximum. This heat is released from the add-on structure (described in section above) which is retrofitted on the flying vehicle. Due to the heat release in the neighbourhood of the flying vehicle by the device, an extended region of low density and negative overpressure is developed. The pressure on the surface of the flying vehicle is substantially lower than the constant value obtained in the absence of energy deposition and the temperature is higher as a result of the hot gases spreading over the surface of the vehicle. The fall in the pressure and density on the vehicle leads to a fall in its drag particularly wave drag. Also, the injection of fluid/energy/ heat increases the shock standoff distance and replaces the stronger shocks with weaker oblique shocks.

Figure 3:
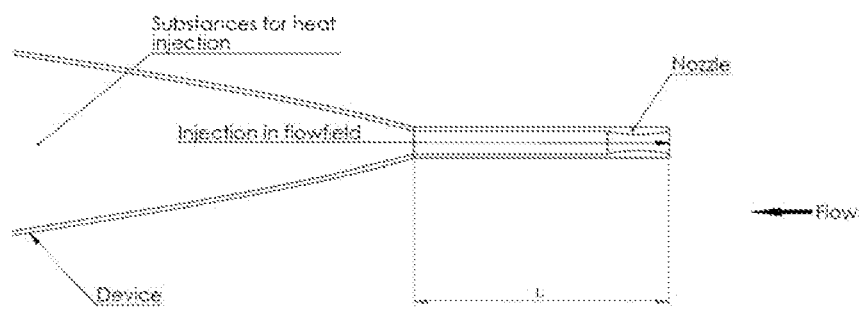
FIG. 3 illustrates a cross-sectional view of the nozzle in the device for injecting heat/energy/fluid for reducing an aerodynamic drag, according to an embodiment herein.

According to an embodiment herein, energy deposition is achieved through the same add-on structure as described in the previous section. The structure is a hollow container. A cutaway view of the nozzle in the pipe is shown in FIG. 3. The forepart or front portion of the device contains a nozzle which injects the fuel/hot gases into the upcoming air-flow ahead of the flying vehicle at a required Mach number. The container/device/structure contains fuels having low auto ignition temperatures. These fuels are auto ignited to produce hot gases, when the fuels are injected into the incoming flow ahead of the flying vehicle, These hot gases are spread over the surface of the flying vehicle thereby reducing the density and pressure which results in a decrease in drag. The auto-ignition takes place due to the high temperatures ahead of the vehicle due to shock wave. The auto-ignition takes place without shock also when the temperature in front of the vehicle is greater than the auto-ignition temperature of the fuel. According to an embodiment herein, the fuels include but are not limited to Acetylene, Ethylene, Methane, Propane etc. According to an embodiment herein, the gas generators producing high temperature gases upon ignition are used. According to an embodiment herein, the fuel/ substances are ignited when the fuel substances come into contact with air (For example carbon disulphide) is used. According to an embodiment herein, the fuels/substances placed in different chambers in the device are allowed to mix when the flying vehicle is airborne. These substances (For example Hypergolic propellants) when mixed generate high temperature gases. According to an embodiment herein, the fuel/substance (For example Hydrogen) which gets ignited inside the device to produce high temperature gases is used. The basic concept is the addition of heat/energy in the neighbourhood of the aerospace vehicle and the heat energy is added in a plurality of ways/methods.

Figure 4:
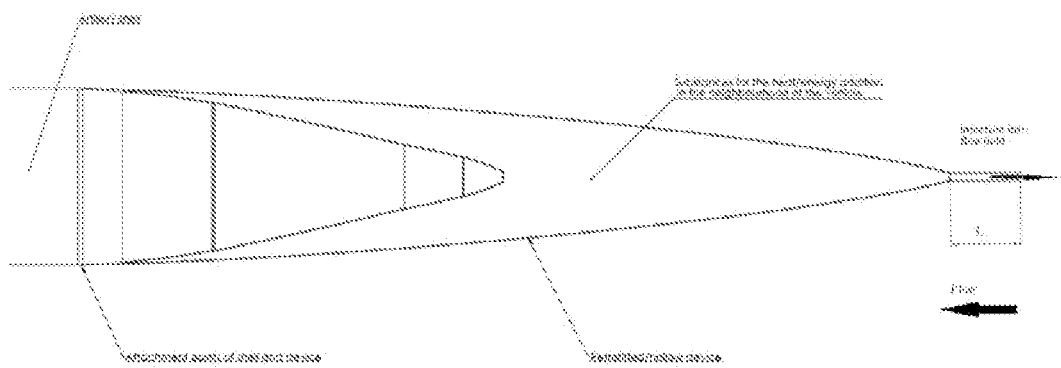
FIG. 4 illustrates a side view of a device integrated with a flying vehicle for heat addition/fluid injection at an optimum distance from the flying vehicle through a pipe for reducing the aerodynamic drag, according to an embodiment herein.

FIG. 4 illustrates a device integrated with a flying vehicle and having a provision for heat addition at an optimum distance from the flying vehicle through the pipe, according to an embodiment herein. According to an embodiment herein, the energy/heat addition is done in the neighbourhood of the flying vehicle and not necessarily in the front of the flying vehicle. The heat addition/fluid injection is done at an optimum distance from the body of the flying/airborne vehicle to achieve the maximum drag reduction. The maximum drag reduction is achieved by installing a tubular section of pre-set length ahead of the device such that hot gases are injected at an optimum distance from the vehicle to get the maximum drag reduction. The device is integrated with a flying vehicle or aerospace system and provided with a mechanism for heat addition at an optimum distance from the flying vehicle through the pipe of length 'l' as shown in FIG. 4. Device is hollow and is filled with fuel/substances that are injected into the neighbourhood of the flying vehicle and ignited to deposit energy/heat in the flow-field.

Figure 5A:
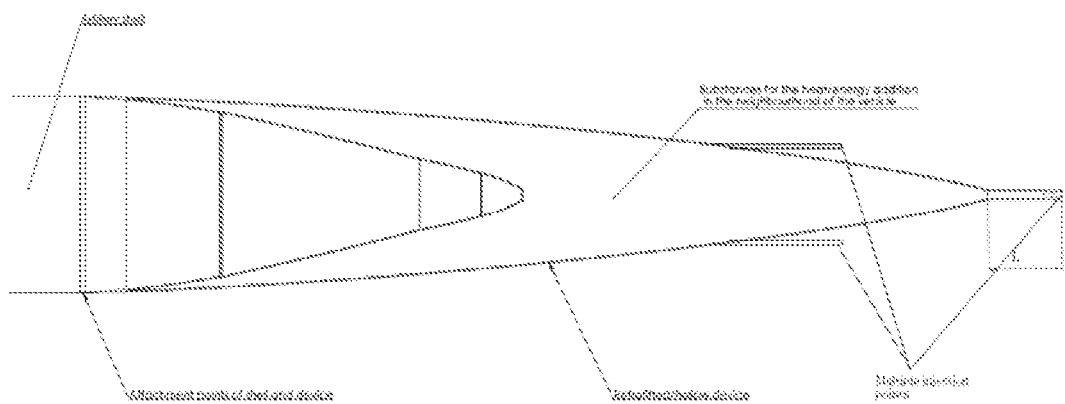
FIG. 5A and FIG. 5B illustrates schematic representations depicting multiple points for heat addition in the flow field, according to an embodiment herein.
Figure 5B:
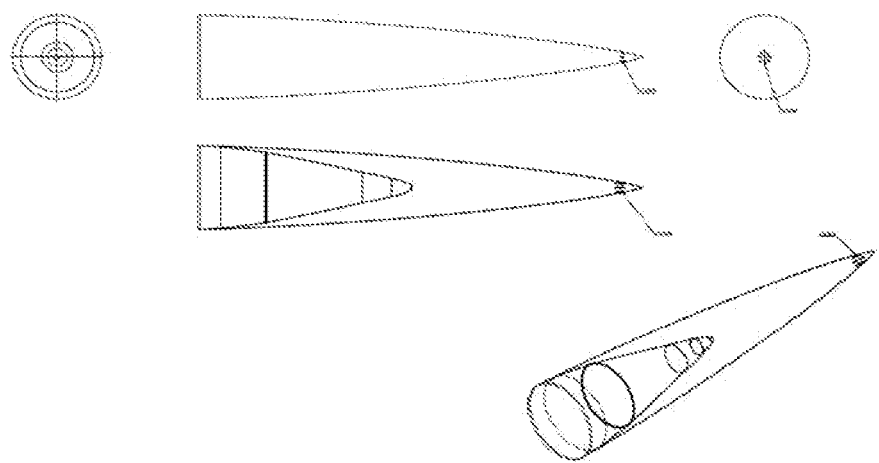

FIG. 5A and FIG. 5B illustrate schematic diagrams depicting multiple points for heat addition in the flow field, according to an embodiment herein. According to an embodiment herein, a plurality of nozzles are provided in the device for purpose of heat/fluid injection are used. The retrofitted kit is attached to the missile/weapon such as original artillery shell at the attachment points as shown in the FIG. 5A. The heat/energy addition is also done in the form of a jet at various Mach numbers and pressures.

Figure 6:
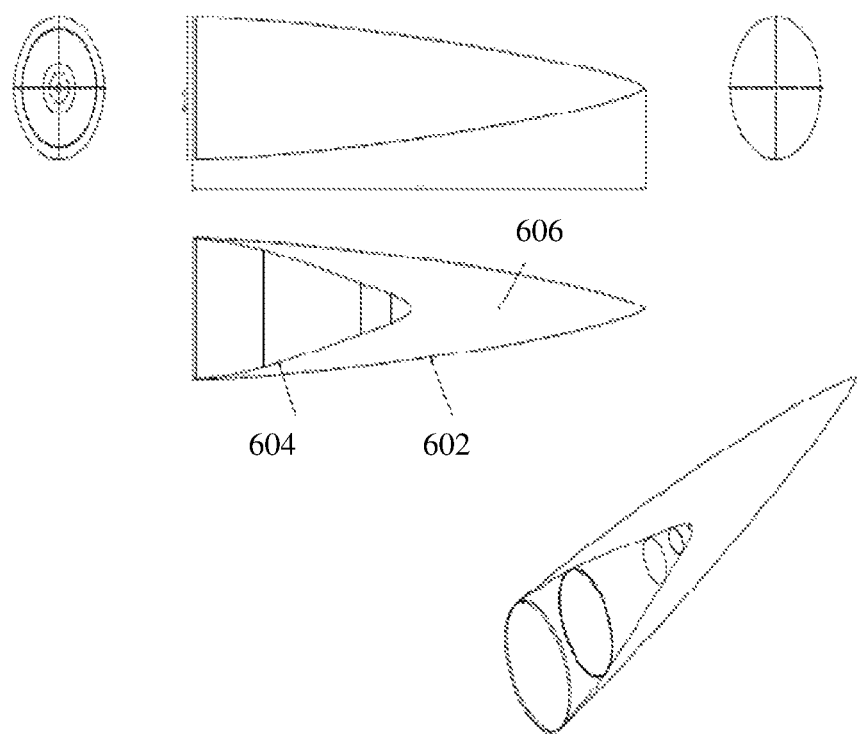
FIG. 6 illustrates aside view of a retrofitted kit/device for reducing the aerodynamic drag experienced by the airborne system, according to an embodiment herein.

FIG. 6 illustrates a schematic diagram depicting a retrofitted kit/device for reducing the aerodynamic drag experienced by the airborne system, according to an embodiment herein. With respect to FIG. 6, the retrofitted kit has a contour configured to offer the minimum drag. The external contour 602 is designed as a Von-Karman nose with a fitness ratio of 5. The rear portion of the kit has the internal contour 604 of the airborne vehicle on which the kit is intended to be installed. According to an embodiment herein, the vehicle is an artillery shell. The retrofitted kit is a hollow structure 606 as shown. The kit is provided as a cap which is installed on the airborne vehicle.

Figure 7:
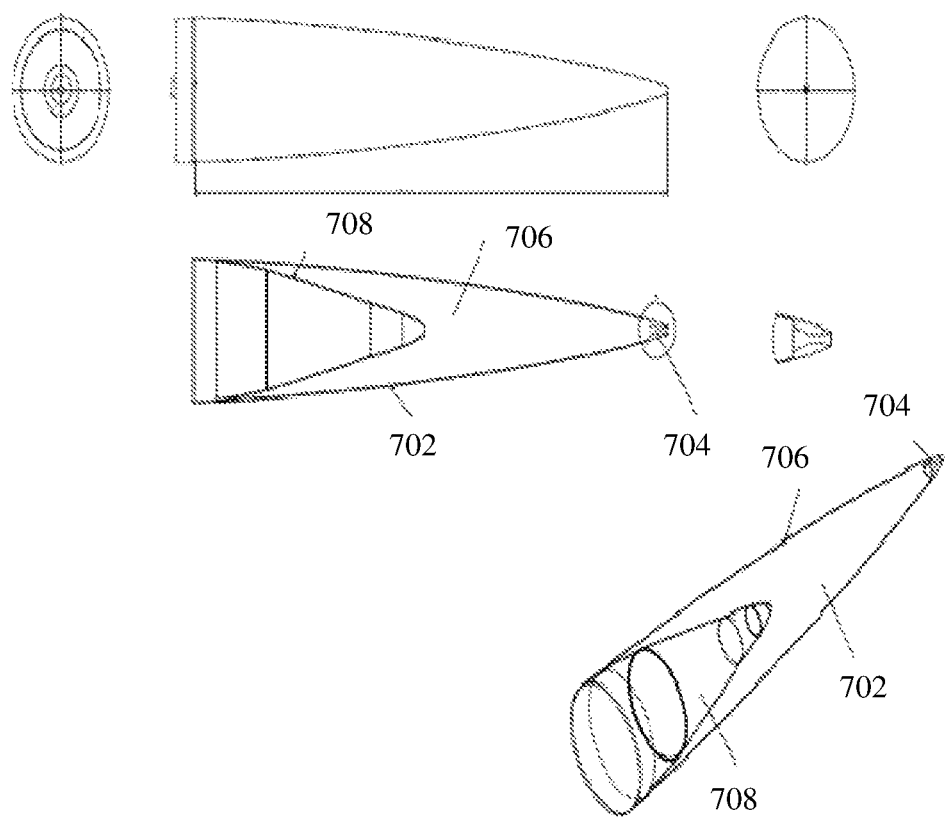
FIG. 7 illustrates a side view of a retrofitted kit/device with an inbuilt nozzle for the purpose of heat injection/energy deposition/fluid injection for reducing the aerodynamic drag experienced by the airborne system, according to an embodiment herein.

FIG. 7 illustrates a schematic diagram depicting the device with a nozzle used in the device, according to an embodiment herein. With respect to FIG. 7, the external contour 702 of the add-on/retrofitted kit has a contour to offer the minimum aerodynamic drag. The whole kit is installed on the airborne vehicle thereby making the vehicle more aerodynamic. The kit has a Von-Karman nose shape with the fitness ratio of 5. The forward section of the add-on kit has a nozzle 704 to inject the gases/fuels/compounds/ substances/fluids in the neighbourhood of the flying vehicle for depositing the heat/energy. The nozzle injects the substances at required Mach number, pressure and mass flow rate. The add-on kit has a hollow container 706 filled with fuels/propellants/compounds/substances which are responsible for heat/energy deposition. These substances/effluences are injected through the nozzle. Rear section of the kit mimics/resembles (is designed with) the contour 708 of the airborne vehicle on which the kit is to be installed.

Figure 8:
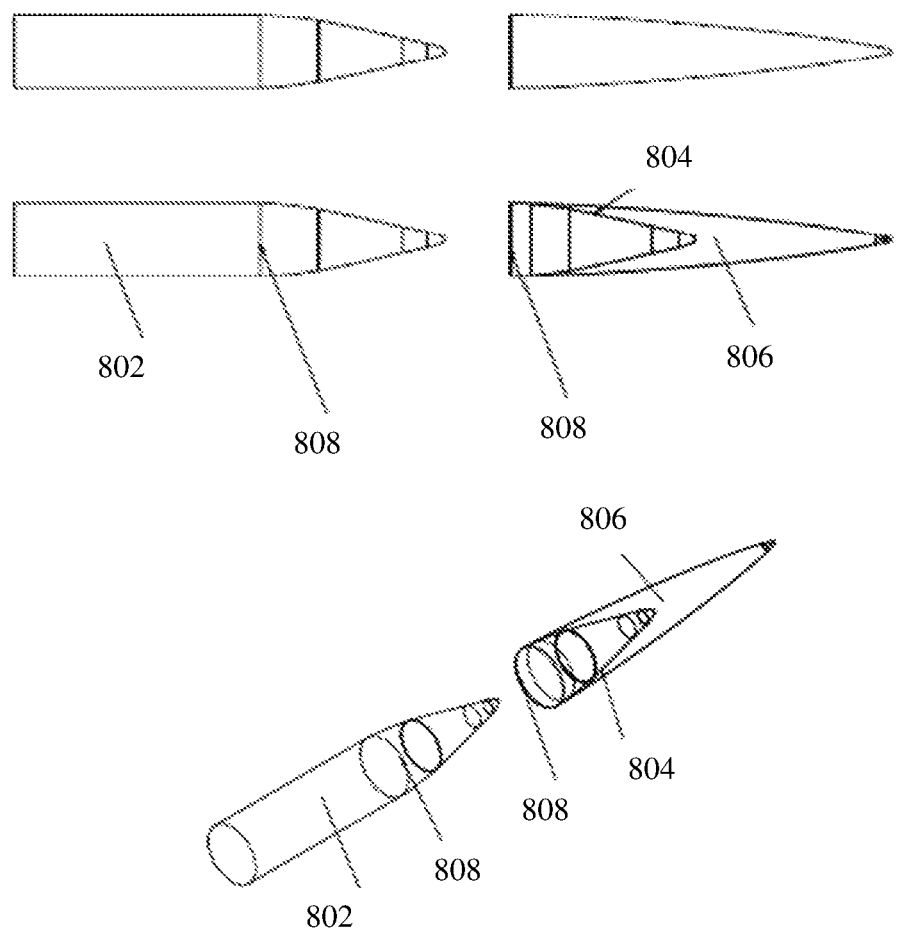

FIG. 8 illustrates a schematic diagram depicting a retrofitted kit/device for reducing the aerodynamic drag experienced by the artillery shell, according to an embodiment herein. The retrofitted kit depicted here is optimized for an artillery shell. The rear section of the kit has the contour of the front section (nose section) to facilitate smooth integration. The contour of the rear section 804 is designed to be that of the forward section of the airborne vehicle on which the kit 806 is to be installed. The region where the kit is connected to the shell at the region 808. The external contour is custom made for various airborne vehicles. The airborne vehicles are connected to the kit using conventional methods like bolts, welds etc.

Figure 9:
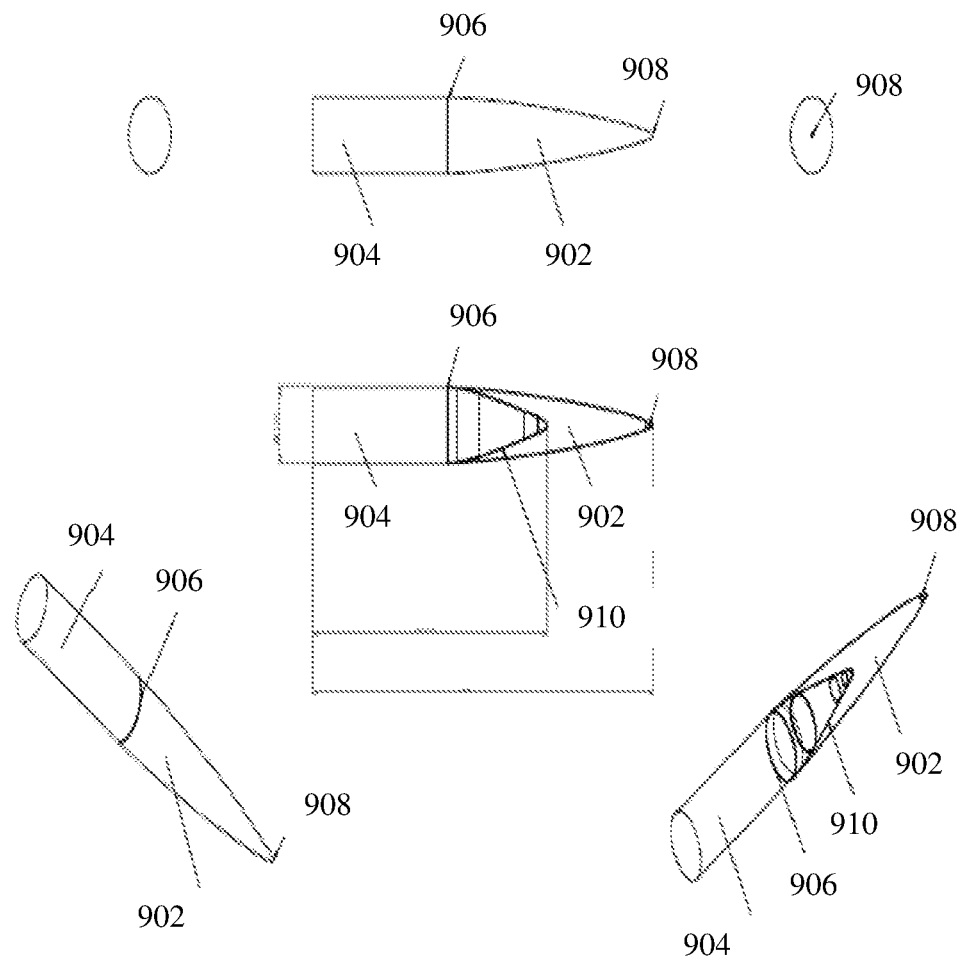

FIG. 9 illustrates a schematic diagram depicting the retrofitted kit installed with the shell, according to an embodiment herein. As shown in the FIG. 9, the retrofitted kit 902 is designed for an artillery ammunition shell 904. The kit is installed on the artillery ammunition shell to provide a considerable drag reduction. The kit has the mechanism of heat/energy deposition/fluid injection in the neighbourhood of the flying vehicle for reducing the drag. The kit is attached to the airborne vehicle using conventional methods like weld, bolts etc. The attachment is shown using reference numeral 906. The installation of the kit results in marginal increase in the length of the shell. The nozzle 908 and the mating between kit and shell 910 are also shown.

Figure 10:
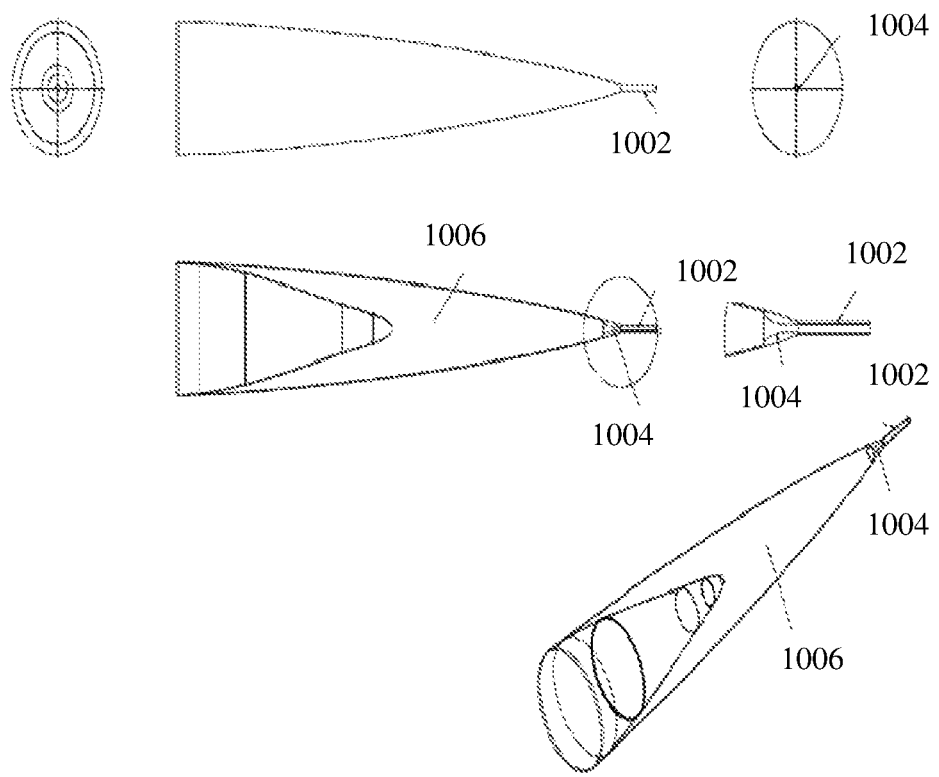

FIG. 10 illustrates a schematic diagram depicting the retrofitted kit with the pipe, according to an embodiment herein. With respect to FIG. 10, the heat/energy addition is done at an optimum distance from the body to maximize the drag reduction. This is achieved through the installation of a tubular section 1002 with a pre-set length ahead to the kit such that the hot gases/fluid are injected at an optimum distance from the vehicle to get the maximum drag reduction. This is also done by adjusting the pressure of the effluence injected. The penetration into the ambient surroundings depends on the pressure of injection. According to one embodiment herein, the nozzle 1004 is installed before the tubular section. According to an embodiment herein, the nozzle is installed in the tubular section. The container is shown using reference numeral 1006.

Figure 11:
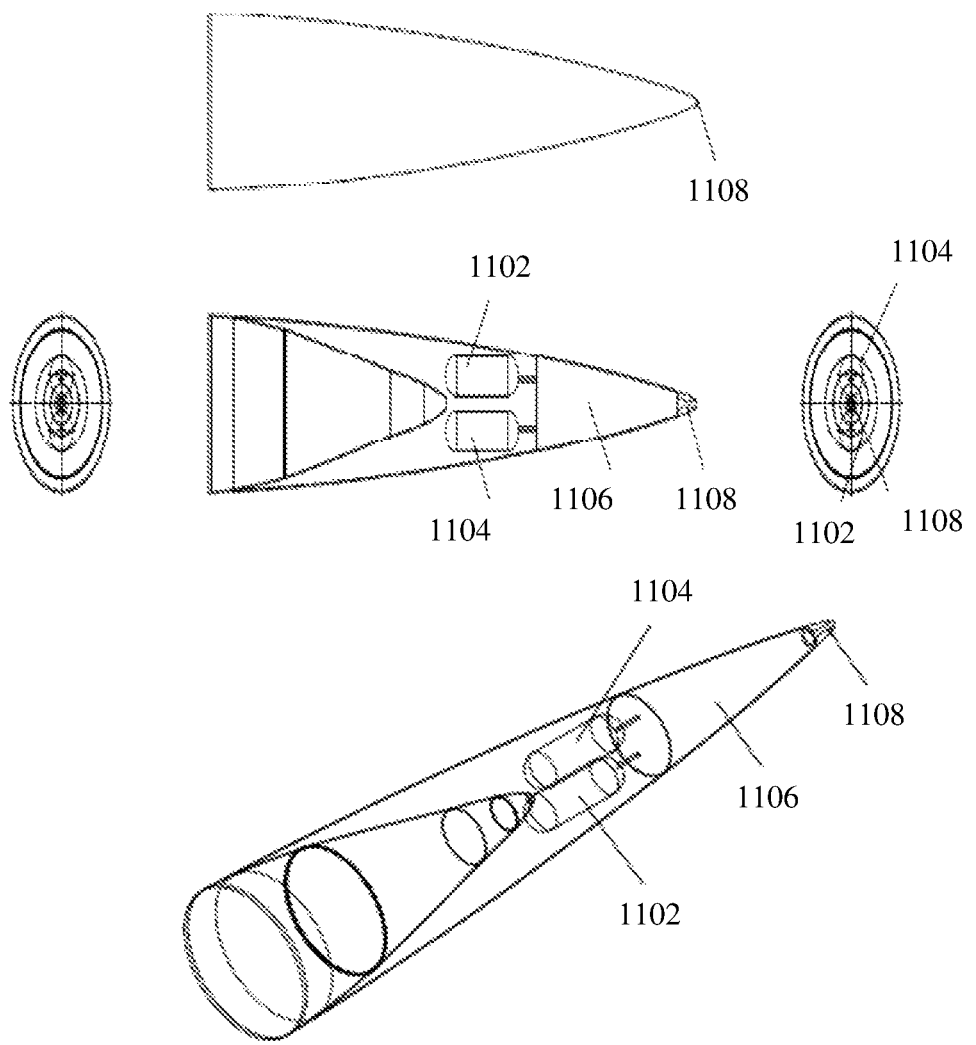

FIG. 11 illustrates a schematic diagram depicting the retrofitted kit with the tanks, according to an embodiment herein. With respect to FIG. 11, the first tank 1102 and the second tank 1104 are filled with fuel and oxidizer or hypergolic propellants. Combustion of these propellants takes place in the combustion chamber 1106. The resultant hot effluences are injected out through the nozzle 1108. Hot effluences are injected out to deposit the heat/energy in the neighbourhood of the flying vehicle.

Figure 12:
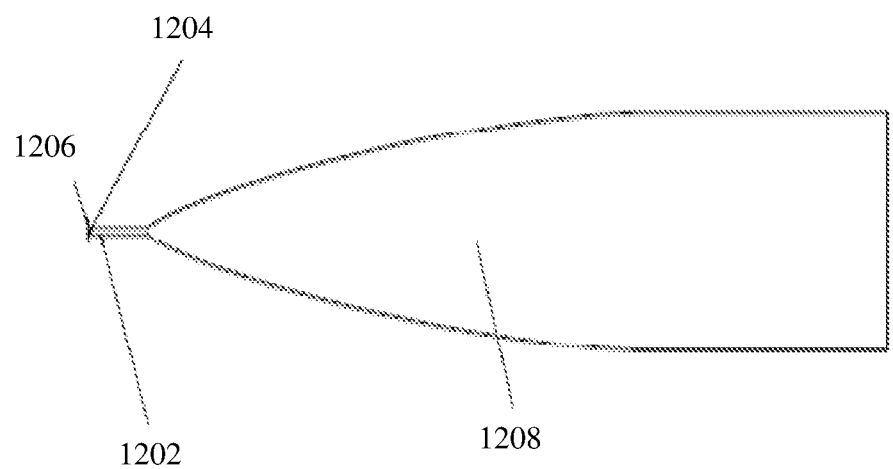

FIG. 12 illustrates a schematic diagram depicting the retrofitted kit with the aero-spike, according to an embodiment herein. With respect to FIG. 12, the heat or energy is deposited/fluid injected through the tubular section 1202 at a distance from the body to get the maximum drag reduction. The length of the tubular section is set as the distance at which heat is deposited to get the maximum drag reduction. A disc is installed in the end of the tubular section through which the effluence is ejected. This disc results in making the tubular section to act as an aero-spike. The nozzle exit (outlet) 1204, the flared section 1206 and the device 1208 are installed an ammunition shell.

Figure 13:
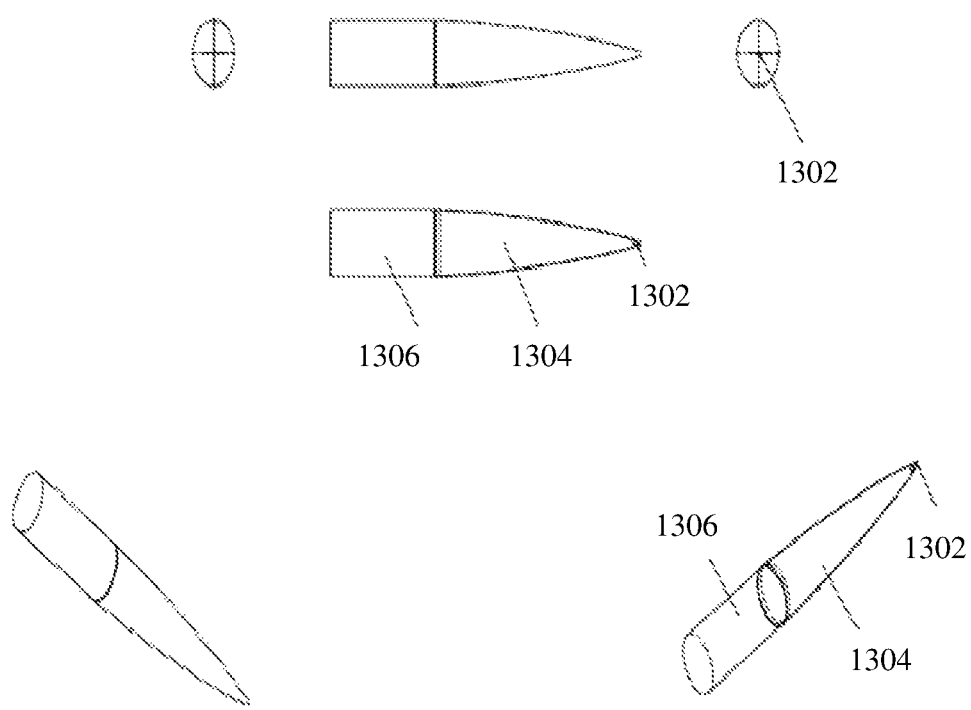

FIG. 13 illustrates a schematic diagram depicting the retrofitted kit as an inbuilt structure, according to an embodiment herein. With respect to FIG. 13, the kit is also useful in applications where a shell/airborne vehicle is made with a hollow compartment. The kit is inbuilt instead of a retrofitted kit. The inbuilt structure has all the features of the retrofitted kit mentioned above. The nozzle, the inbuilt hollow container and the payload are shown using reference numerals 1302, 1304 and 1306 respectively.

Figure 14:
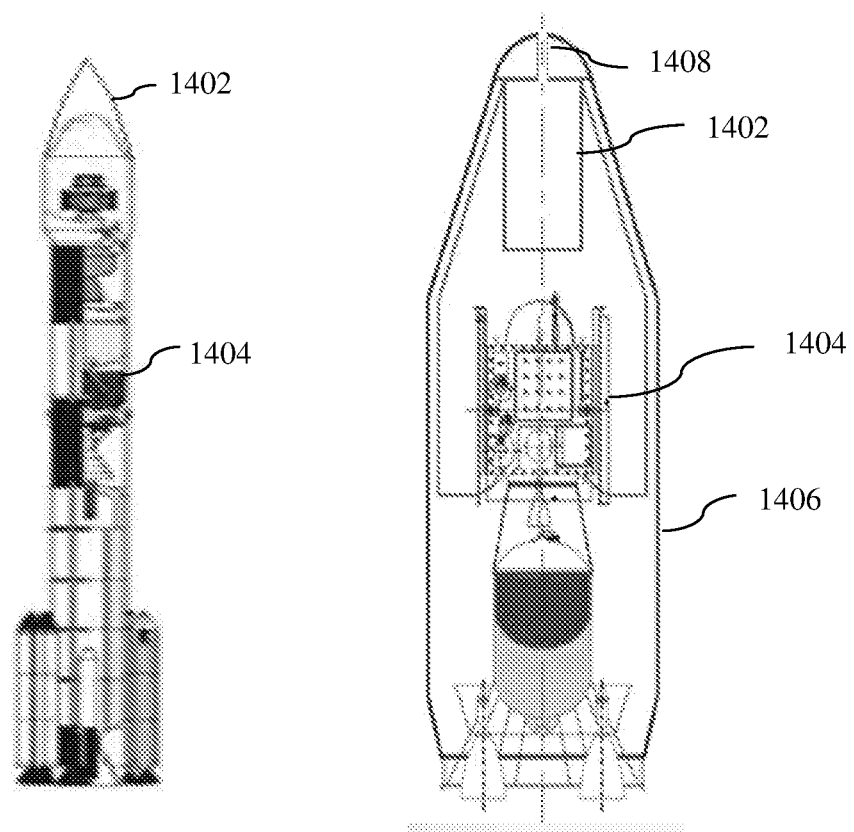

FIGS. 14A and 14B illustrate schematic diagrams depicting the retrofitted kit installed with a launch vehicle and a payload section of launch vehicle respectively, according to an embodiment herein. With respect to FIG. 14A, the retrofitted kit 1402 is attached to the launch vehicle 1404. With respect to FIG. 14B, the retrofitted kit 1402 is installed inside the payload section of the PSLV 1404. Further, the launch vehicle is provided with the shroud 1406 and the vent/nozzle 1408.

According to an embodiment herein, simulations are conducted on Polar Satellite Launch Vehicle (PSLV) to see the effect of installation of one of the embodiments of the retrofitted kit 1402 on the vehicle's drag characteristics. Here, two embodiments of the invention are used in the simulation experiments. In the first embodiment, an add-on kit with an optimized shape is provided to offer the lowest aerodynamic drag. The retrofitted kit/device has mechanism to deposit heat/energy/fluid in the neighbourhood of the vehicle. The device is installed on the upper stage of the vehicle as shown in FIG. 14A.

According to an embodiment herein another embodiment of the retrofitted kit 1402 is installed on the vehicle in the second case for conducting the simulation experiment. In this case, the device is installed inside the payload compartment of the vehicle as shown in FIG. 14B. The device is installed near the nose portion of the vehicle. A vent/nozzle is provided in the nose section of the vehicle. The device is configured to deposit heat/energy/fluid in the neighbourhood of the vehicle through the vent. The methodology of heat/energy/fluid addition is already explained above.

Figure 15:
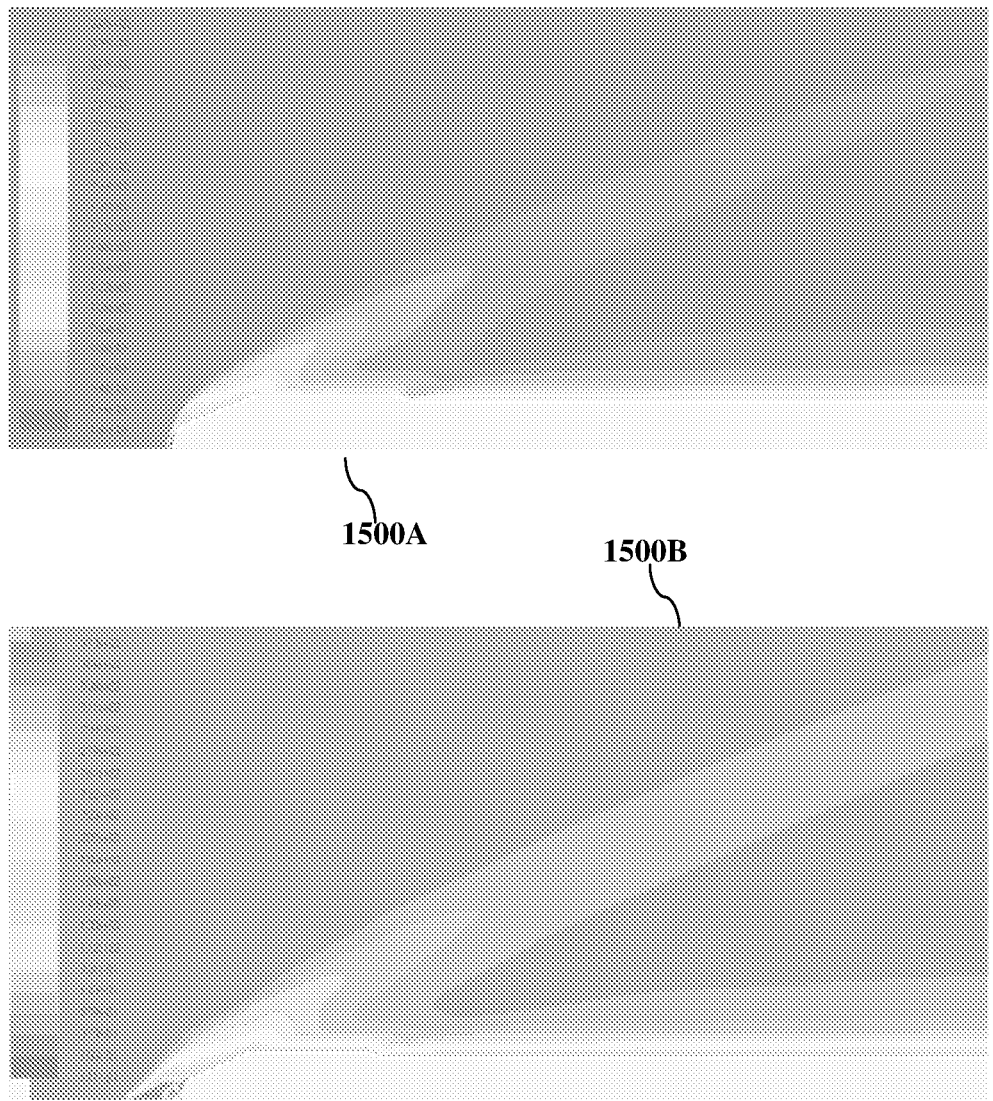

FIG. 15 A and FIG. 15B illustrate schematic diagrams depicting simulation results for flow field of a launch vehicle such as PSLV without and with installation of the retrofitted kit respectively, according to an embodiment herein. The simulations are conducted at flying conditions of the rocket after 70 seconds of launching. As shown in FIG. 15, the jet is injected in the neighbourhood of the vehicle for the heat/energy deposition to alter the flow field around the vehicle vis-A-vis the vehicle with no heat/energy injection. FIG. 15 depicts the Mach contours over the vehicle with and without installation of the device. It is observed that the installation of the device in its second embodiment reduces the drag of the vehicle by about 55%.

Figure 16:
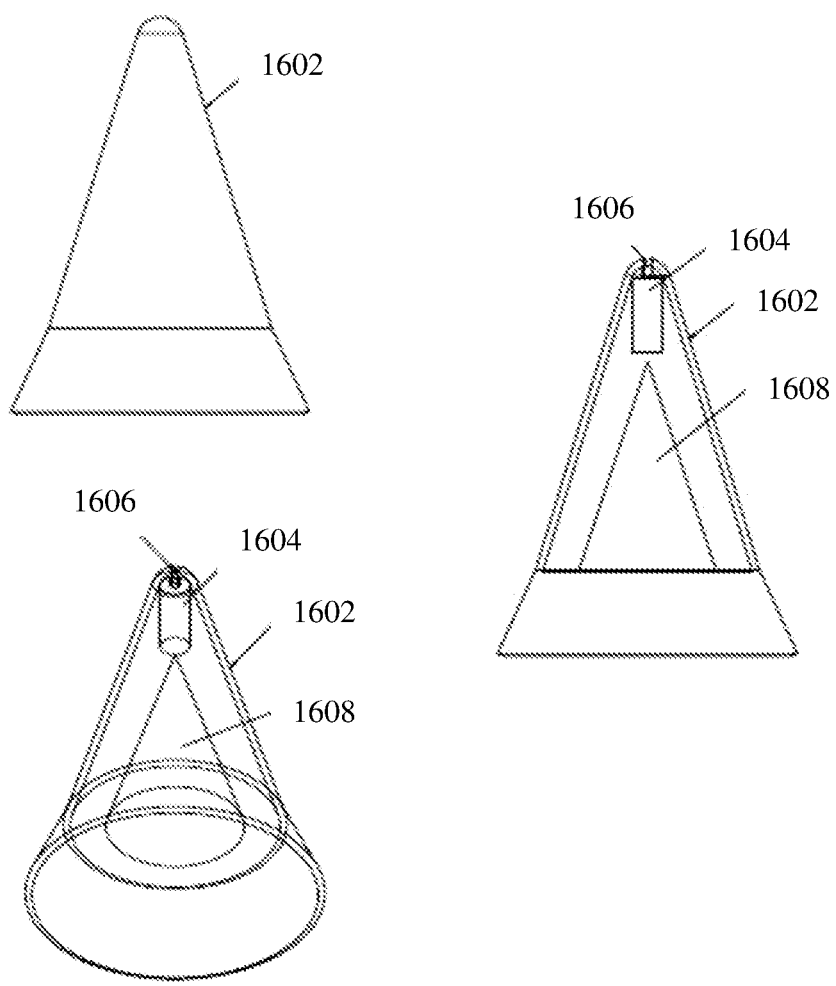

FIG. 16 illustrates a schematic diagram depicting the retrofitted kit installed with an Intermediate Range Ballistic missile (IRBM), according to an embodiment herein. With respect to FIG. 16, the IRBM is mounted with the nose cone 1602, the retrofitted kit 1604, the nozzle 1606 and the payload 1608.

According to an embodiment herein, simulations are conducted on the missile to see the effect of installation of the system to estimate missile's drag characteristics. The missile is an Intermediate Range Ballistic missile (IRBM) configured for hitting targets up to a distance of 3500 km.

Three flying conditions from the lofted trajectory of missile are selected to see the effect of installation of the device on the drag characteristics of the missile. These flying conditions correspond to the Sonic boom, Max Q (maximum dynamic pressure condition) and End of booster stage events in the lofted trajectory of missile. The installation of the device on the vehicle is shown in FIG. 16.

According to an embodiment herein, the simulation results indicated an average drag reduction of about 52%. Installation of the invention results in considerable drag reduction which in-turn results in increased range of the missile. Consequently another aspect of the installation is that the missile systems for the same range require less propellant thereby making the missile system smaller and lighter. Further, simulations on various types of flying vehicles are conducted to demonstrate that the invention and its embodiments are configurable to be used on various types of aerospace vehicles.

Figure 17A:
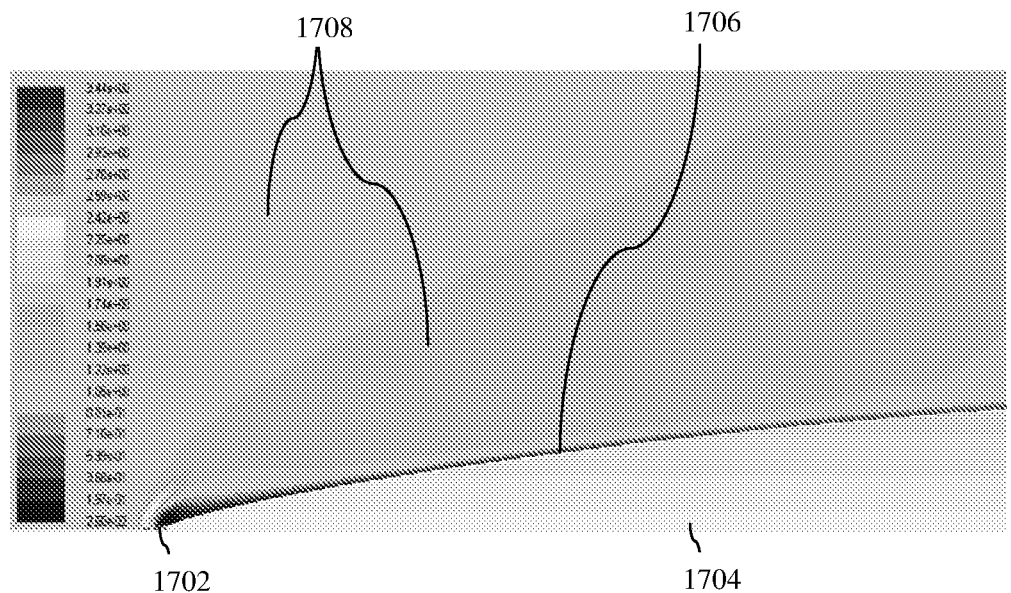
Figure 17B:
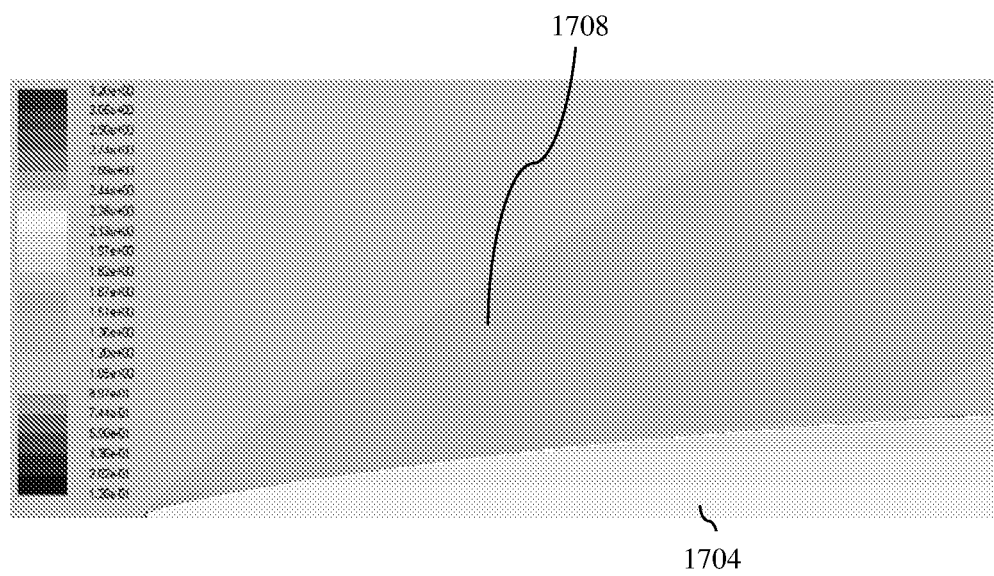

According to an embodiment herein, Computational Fluid Dynamics (CFD) simulations are carried out to see the effect of the add-on kit (device) on drag and the range characteristics, when installed on the artillery ammunition. According to an embodiment herein, a simulation study considering the firing of the artillery gun such as M795 from a BAE systems M777 lightweight howitzer is conducted to see the effect of the add-on kit on the drag and trajectory of the shell. Here, the velocity of the shell is considered as 827 meter per second (m/s). This is the muzzle velocity of the primary artillery gun such as M777 howitzer of the US Army, US Marine Corps and many other allied nations. M777 is a 155 mm/39 calibre light weight howitzer which fires 155 mm ammunition. Simulations are carried out on an M795 shell first and the air-flow pattern and the drag are estimated. Thereafter, the add-on device is installed on the M795 shell and the simulations carried out include M795 with the add-on device installed without energy/heat deposition done in the neighbourhood of the shell and M795 with the add-on device installed with energy/heat deposition in the neighbourhood of the shell as shown in FIGS. 17A and 17B respectively.

According to an embodiment herein, the hot effluent is ejected out from the nozzle 1702 of the add-on device 1704. The nozzle comprises an exit diameter of 5 mm and the hot effluent is injected at a Mach No. of 1.05. Following observations are made for this embodiment:

(a) A drag reduction of 45% is attained with the installation of the device on artillery ammunition such as M795. This is achieved without heat/energy deposition.

(b) A drag reduction of 58% is attained with the installation of the device on artillery ammunition with fluid injection such as M79r.

(c) Total drag reduction of 64% is attained when the device is installed on artillery ammunition such as M795. The device in this case deposits heat/energy in the neighbourhood of the shell.

Further, it is observed that the shell is engulfed by a region of low density 1706 when heat/energy deposition is done in the neighbourhood of the aerial vehicle 1704 through the device as shown in FIG. 17A. It is concluded that this region of low-density results in considerable drag reduction. This region of low density is absent in the case with no heat/energy deposition as shown in FIG. 17B. The high-density region is represented using reference numeral 1708.

Figure 18:
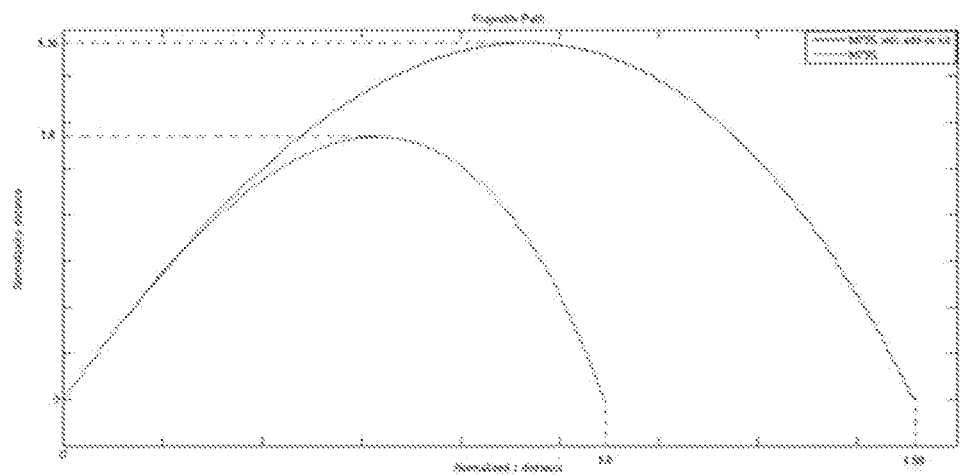

FIG. 18 illustrates the normalized trajectories of artillery ammunition such as M795 installed with the add-on kit, according to one embodiment of the embodiments herein. With respect to FIG. 18, the scales used in the x axis and y axis are different. Here, the trajectory of the M795 shell with and without the add-on kit is calculated. It is found that the range of the shell when fired from M777 is increased by about 60%. This is a remarkable increase in the capabilities of the existing artillery gun and the existing artillery ammunition. The simulation shows that with the installation of the device on the standard M795 shell, the range of the M777, which is a 39-calibre gun has become at par with more capable 52 calibre guns and beyond. The capability extends the operational envelope of the 155 mm/39 cal, 155 mm/45 cal and 155 mm/52 cal artillery weapons into the domain reserved for rocket artillery. The capability enhancement with the addition of the kit is considerably greater than the Base bleed or EFRB technologies.

Moreover, an extended range version of the M795 projectile is desirable. The US Army has identified a need to provide extended range 155 mm high explosive (HE) projectiles for both current and future artillery systems. The current M795 projectile falls short of the Army's requirements. The currently approved M795 Operational requirement Document (ORD) establishes the need for an extended range version of the M795 to support anticipated war fighting scenarios. The add-on kit/device can be used to meet or exceed the mentioned requirements by a vast margin.

According to an embodiment herein, the objective of the simulation studies conducted here is to prove the feasibility of using an add-on kit with the provision of heat/energy deposition to reduce the aerodynamic drag on a flight vehicle thereby enhancing the performance of the flight vehicle. Large number of variations can be done in the device with respect to the size of the exit nozzle, Mach no. of heat/energy injection, position of the nozzle, number of nozzles, point/region of heat injection in the neighbourhood of the flight vehicle, method of heat/energy deposition etc. This results in the best configuration and design of the add-on kit for the particular airborne system.

Figure 19:
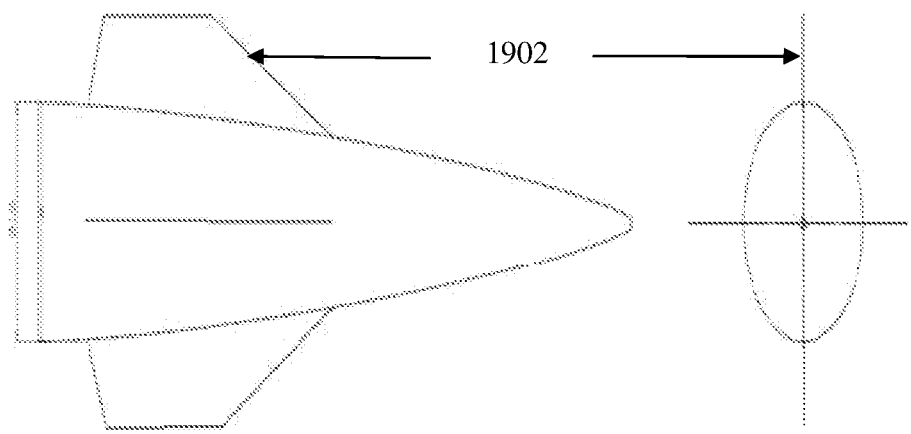

FIG. 19 illustrates a schematic diagram depicting wings attached to the add-on kit, according to an embodiment herein. With respect to FIG. 19, the wings 1902 are attached to provide lift to the airborne vehicle thereby increasing its range. In one example embodiments, these wings are configured for being movable to steer the airborne vehicle.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications.

The embodiments herein provide a device that reduces the aerodynamic drag experienced by the airborne systems. The device when installed on the existing systems like launch vehicles, missiles is configured to increase the capabilities of the system enormously. The device installed on aircraft like aerospace vehicle is configured for considerable drag reduction thereby increasing the fuel efficiency of the vehicle. The device is a low cost solution for an add-on retrofitted kit in addition to an inbuilt system. During ascent phase of a launch vehicles, ICBM's, missiles etc., the vehicle has to travel through the dense atmosphere of the earth. In this region of the flying, the vehicle experiences very large drag. Installation of the embodiments of the device on the different types of launch vehicles and ballistic missiles type aerospace vehicles results in lower drag being experienced by the rocket. This results in more payload weight to be carried into the orbit with the same amount of propellant and hardware. This device enables the existing launch vehicles to carry much heavier payload into the orbit thereby eliminating or reducing the requirement of building a new generation of heavy launch vehicles. Theoretically as an example, the use of the device in the existing launch vehicle like Space X's Falcon Heavy or ISRO's GSLV reduces a need to develop more heavy launch vehicles like BFR as the existing launch vehicle is designed to carry heavier payloads. The reduction of the aerodynamic drag reduces the thrust requirement for the vehicle to reach orbit. As a result, this device is configured to reduce requirement and hence helps in generating/developing light weight launch vehicles.

When a rocket or an ICBM is passing through 'MaxQ' i.e. the maximum dynamic pressure region during its ascent, there is a huge amount of stress on the vehicle. The installation of the device results in lesser stress being experienced by the vehicle. Installation of the device enables considerable large vehicles to reach space using considerably lesser fuel.

The device installed on Intercontinental Ballistic Missiles (ICBM) and other type of missiles including ballistic missiles and other missiles results in significant drag reduction. This results in considerable range increase of the missile systems. Another aspect of the installation of the device is that the missile requires lesser fuel for the same range hence making missile systems lighter and smaller with the same capabilities.

It is seen from the simulations that the device installed on the legacy and missile systems is configured/designed to reduce the drag immensely. This greatly increases the 'Thrust-Drag' characteristics of the system which in turn result in the system accelerating to higher speeds. It is widely agreed that there is a need for hypersonic weapons. Hypersonic technology involves air-breathing Scramjet propulsion which is a complex technology to perfect. With the installation of the device on the airborne systems, it is possible for the same system to operate at high Mach regime including hypersonic regime without the Scramjet engine thereby developing faster, cheaper and less complex systems. The same technology is applied in civilian domain also for faster transportation.

The device saves the investment on airborne systems that are designed to increase the efficacy of the particular class of airborne systems. In addition to the applications as explained above, advantages in the defence systems are immense. For example, requirement to design and development of new shells like HVP is not needed as the embodiments herein gives the same capabilities to the older existing systems. Also the performance of the systems is further increased. In case of artillery, ammunitions, mortars etc, the embodiments herein relieve the need of a rocket motor to extend the range of the gun.

The system of the embodiments herein is simple and easy to realize with minimum investment. The system of the embodiments herein is realized at a fraction of the cost and at a fraction of the time with the same or enhanced capabilities as compared to HVP. The installation of the invention on legacy and ammunition implies that the present gun systems, and mortars systems are configured to fire the same shell at a longer range without any modification to the gun, mortar systems and other systems.

Further, the embodiments herein are configured for different types and classes of airborne systems like 155 mm, 130 mm, 105 mm etc howitzer shells, 5" naval guns, 76 mm naval guns, tank ammunition, rockets, launch vehicles, mortars, missiles, aircrafts and many others. The application areas include the companies involved in design, development and manufacturing of airborne systems like artillery shells, mortars, rockets, missiles, tank ammunition etc. These firms comprise private firms, defence contractors, aircraft manufacturers, weapons research organizations, aerospace organisations as well as government agencies such as armed forces and space research agencies.

According to an embodiment herein, the system is installed in a flying vehicle selected from a group consisting of a flight vehicle, aerospace vehicle, missile, launch vehicle, artillery, ammunition, ballistic missile, ICBM. According to an embodiment herein, the system is installed in underwater moving vehicles such as torpedoes, submarines, ships or in automobiles such as racing cars, bikes, and fast-moving automobiles.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A device for reducing aerodynamic drag experienced by airborne systems, the device comprising:
   a hollow structure/container configured for retrofitting or inbuilt on a flying vehicle, and wherein the hollow structure/container comprises an internal surface and an external surface, and wherein the internal surface of the hollow structure/container is configured for physically attaching with the flying vehicle, to alter an external profile of the flying vehicle and to modify a shape of the flying vehicle to provide a minimum aerodynamic drag, and wherein the hollow structure/container comprises a plurality of chambers filled with one or more fuels/propellants/compounds/substances, and wherein the one or more fuels/propellants/compounds/substances is selected from a group consisting of a gas, vapour, liquid, particulate aerosol, solid, and a mixture thereof; and wherein the plurality of chambers within the hollow structure/container is filled with the one or more fuels/propellants/oxidizers/substances and wherein the fuels/propellants/oxidizers/substances present in the plurality of chambers are configured for ignition inside the device for increasing temperature or for producing hot gases around the flying vehicle, when the flying vehicle is airborne;

one or more nozzles present in the external surface of the hollow structure/container, and wherein the one or more nozzles are configured for injecting the one or more gases/fuels/compounds/substances/fluids into an upcoming airflow in a neighborhood of the flying vehicle to deposit energy/heat in the neighborhood of the flying vehicle to achieve further aerodynamic drag reduction;

wherein the one or more chambers are filled with a plurality of mutually different propellants and oxidizers that are configured to combust and produce heat/energy:

wherein an amount of injection and a pressure of injection of the one or more gases/fuels/compounds/substances/fluids injected into an upcoming airflow in the neighborhood of the flying vehicle are selected based on Mach speed of the flying vehicle;

wherein a mass flow rate, an injection Mach number, a temperature and a pressure of gases/fuels/compounds/substances/fluids are changed to increase a drag reduction; and wherein an add-on kit is shaped as a Von-Karman nose with a fineness ratio of 5 and is integrated on the flying vehicle.

2. The device according to claim 1, wherein the hollow structure/container is configured in a shape based on one or more flying conditions of the flying vehicle, and wherein the shape is selected from a group consisting of a plurality of shapes comprising a Haack-series based nose cone, power series based nose cone, Von Karman nose cone, parabolic nose cone, conical, bi-conical, tangent ogive, spherically blunted tangent ogive, secant ogive, elliptical shape.

3. The device according to claim 1 further comprise a tubular section formed ahead of the hollow structure/container for injecting hot gases/fluids for depositing heat/energy/fluid at an optimum distance from the flying vehicle to achieve maximum drag reduction, and wherein the tubular section has a pre-set length.

4. The device according to claim 3, wherein the one or more nozzles is of Von-Karman nose shape and the one or more nozzles are configured for injecting the hot gases that are spread over a surface of the flying vehicle for reducing a density and pressure in an area around the flying vehicle to decrease the aerodynamic drag experienced by the flying vehicle.

5. The device according to claim 1, wherein the one or more fuels have low auto ignition temperatures for initiating auto-ignition of the fuels due to temperatures ahead of the flying vehicle and shock waves generated form a movement of the flying vehicle, and wherein the one or more fuels comprises Acetylene, Ethylene, Methane, and Propane.

6. The device according to claim 1 further comprises one or more gas generators placed within the hollow structure, and wherein the gas generators are configured for increasing temperature or for generating hot gases on ignition wherein the generated hot gases are ejected out of the structure through the one or more nozzles.

7. The device according to claim 1, wherein the one or more fuels/substances are configured for autoignition automatically or spontaneous ignition due to the increased temperature in the neighbourhood of the vehicle, when the one or more fuels/substances come into contact with air.

8. The device according to claim 1, wherein the plurality of chambers within the hollow structure/container is filled with one or more fuels/propellants/compounds/substances present in the plurality of chambers are configured for ignition inside the device for increasing temperature or for producing hot gases around the flying vehicle, when the flying vehicle is airborne.

9. The device according to claim 1 wherein the one or more fuels/substances are first ignited using an igniter or a pilot flame to start a combustion of the fuel, and wherein the combustion of the fuel is configured to be self-sustained, and wherein an assisted combustion is continued throughout.

10. The device according to claim 1, wherein the flying vehicle, is selected from a group consisting of a flight vehicle, aerospace vehicle, missile, launch vehicle, artillery, ammunition, and ballistic missile.

\* \* \* \* \*